United States Patent [19]

Windemuth et al.

[11] 4,096,162

[45] Jun. 20, 1978

[54] PROCESS FOR THE PRODUCTION OF NEW POLYSILOXANE-POLYOXYALKYLENE COPOLYMERS WITH REDUCED BURNING PROPERTIES

[75] Inventors: Erwin Windemuth, Bad Sooden-Allendorf; Manfred Dahm, Leverkusen; Manfred Dietrich, Leverkusen; Peter Müller, Leverkusen, all of Germany

[73] Assignee: Bayer Aktiengesellschaft, Leverkusen, Germany

[21] Appl. No.: 748,029

[22] Filed: Dec. 6, 1970

[30] Foreign Application Priority Data

Dec. 24, 1975 Germany .............................. 2558523

[51] Int. Cl.² ............................ C07F 7/08; C07F 7/10
[52] U.S. Cl. ........................ 260/448.2 B; 200/2.5 AH
[58] Field of Search .................................. 260/448.2 B

[56] References Cited

U.S. PATENT DOCUMENTS

| 3,246,048 | 6/1966 | Haluska ..................... 260/448.2 B X |
| 3,398,104 | 8/1968 | Haluska ..................... 260/448.2 B X |
| 3,402,192 | 9/1968 | Haluska ....................... 260/448.2 B |
| 3,505,377 | 4/1970 | Morehouse ................... 260/448.2 B |
| 3,896,123 | 7/1975 | DeZuba et al. ........... 260/448.2 B X |

FOREIGN PATENT DOCUMENTS

| 2,129,922 | 12/1971 | Germany .............. 260/448.2 B UX |
| 1,929,034 | 12/1970 | Germany .............. 260/448.2 B UX |
| 2,002,064 | 7/1971 | Germany .............. 260/448.2 B UX |

*Primary Examiner*—Paul F. Shaver
*Attorney, Agent, or Firm*—Gene Harsh; Joseph C. Gil; R. Brent Olson

[57] ABSTRACT

The invention relates to a method of making branched polysiloxane-polyoxyalkylene copolymers and to their use as stabilizers in the production of polyurethane foam plastics. The copolymers are made by reacting specified organopolysiloxanes with polyisocyanates, heat treating the NCO-containing addition products to cause branching and reacting the branched NCO-containing addition products with monofunctional polyethers. The copolymers can be used to stabilize polyurethane foam reaction mixtures.

7 Claims, No Drawings

PROCESS FOR THE PRODUCTION OF NEW POLYSILOXANE-POLYOXYALKYLENE COPOLYMERS WITH REDUCED BURNING PROPERTIES

BACKGROUND OF THE INVENTION

The instant invention relates to a process for the production of new, branched polysiloxane-polyoxyalkylene copolymers and to their use as stabilizers in the production of polyurethane plastics.

Polysiloxane-polyoxyalkylene copolymers (hereinafter abbreviated to "PPC") are known and used as stabilizers and cell regulators in the production of foams made by the diisocyanate polyaddition process. Because of their particular chemical structure (i.e., strongly hydrophobic, generally branched polysiloxanes are chemically attached in a variety of different ways to polyoxyalkylene ethers differing from one another in their hydrophilicity), products of this type are able to reduce the surface tension of a foamable mixture to a relatively large extent. As a result, the cells in the process of formation are stabilized during the foaming reaction, so that the blowing gas which is formed during the reaction or which is already present in the mixture develops its full effect and foams having a strictly reproducible density are obtained. In addition, PPC's also improve the homogeneity of the cell structure, and favorably influence the mechanical properties of the foams.

Accordingly, PPC's which are used in both rigid and flexible foams and in both polyester and polyether foams, are important constituents of any foaming formulation. Thus, because of the large number of variants in the foaming process, an equally large number of PPC's are known and used. In spite of this, the generally known compounds to date are not able to solve every problem in the polyurethane foam area. Thus, in the production of foams from polyalkylene glycol ethers and simple polyisocyanates, such as tolylene diisocyanate, the use of PPC is equally as important as, for example, the use of tin catalysts because the foamable mixtures are of a very low viscosity and have to be stabilized if a pore structure is to be obtained. According to more recent discoveries (see, e.g., German Offenlegungsschrift No. 2,129,922), the PPC's currently in use adversely affect the burning properties of the foams, i.e., the foams are inflammable. It can be shown that any reduction in the concentration of PPC is accompanied by an improvement in burning properties and, thus, an optimum in burning properties is obtained when no PPC at all is used. Since as mentioned above, polyalkylene glycol ether foam formulations based on the conventional isocyanates have to be stabilized, it is necessary in the absence of PPC to take specific measures, for example, though the use of modified polyisocyanates of higher functionality and viscosity (see, e.g., German Offenlegungsschrift Nos. 1,929,034 and 2,002,064). However, these particular measures make the foaming process relatively complex and uneconomical. Accordingly, there still exists the problem of finding PPC's which do not adversely affect the burning properties of polyether polyurethane foams, but which nevertheless show the required stabilizing and cell-regulating effect.

Surprisingly, this problem is solved by the polysiloxane-polyoxyalkylene copolymers made available by the present invention.

DESCRIPTION OF THE INVENTION

The present invention relates to a new, simple and hence highly economical process for the production of PPC's differing widely in their structure and showing a variety of different properties, and to the use thereof as stabilizers and cell regulators in the production of polyurethane forms. The PPC's produced in accordance with the present invention have a high stabilizing capacity for polyether polyurethane foam mixtures and also improve the flameproof properties thereof.

The process of the instant invention broadly comprises reacting organopolysiloxanes corresponding to the general formula:

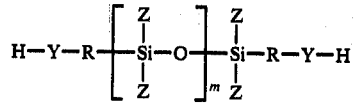

wherein $m$ represents an integer of from 1 to 100, $z$, which may be the same or different, represents a $C_1$-$C_5$ alkyl radical, $C_6$-$C_{15}$ aryl radical, a siloxyl or a siloxanyl radical or the group —R—Y—H, R represents a $C_1$-$C_6$ alkylene radical, optionally containing one or more hetero atoms, Y represents —NR'—, —O—,

or —S— and R' represents a hydrogen atom or a $C_1$-$C_6$ alkyl or $C_5$-$C_9$ cycloalkyl radical; with polyisocyanates in an equivalent ratio NCO:YH of ≧ 2. The NCO-containing addition products thus obtained are heated at from about 110° to about 160° C whereby they are branched. The resulting relatively high molecular weight and branched NCO-containing addition products are then reacted with monofunctional polyethers corresponding to the general formula:

wherein $n$ represents an integer of from 2 to 4, $x$ represents an integer of from 1 to 100 and R" representa a monofunctional $C_1$-$C_{20}$ hydrocarbon radical optionally containing oxygen or nitrogen as hetero atoms, in an NCO:OH ratio of from about 0.8 to about 1.2.

The present invention also relates to the use of the polysiloxanepolyoxyalkylene copolymers obtained by this process as foam stabilizers and cell regulators which improve the flameproof properties of the foams in which they are incorporated.

The polysiloxanes which may be used in accordance with the present invention are known and are described, for example, in German Auslegeschriften Nos. 1,114,632; 1,190,176 and 1,248,287. These polysiloxanes contain at least two carbofunctional groups which are attached to silicon and which contain isocyanate-reactive hydrogen atoms. The carbofunctional groups are preferably aliphatic $C_1$-$C_6$ hydrocarbon radicals (optionally containing hetero atoms), which contain at least one hydroxyl, carboxyl mercapto or primary or secondary amino group.

The following are specific examples of such carbofunctional radicals:
hydroxymethyl
—CH$_2$OH
hydroxybutyl
—(CH$_2$)$_4$OH
β-hydroxyethyloxymethyl
—CH$_2$—O—CH$_2$—CH$_2$—OH
β-hydroxyethyl mercaptomethyl
—CH$_2$—S—CH$_2$—CH$_2$—OH β,γ-dihydroxypropyl mercaptomethyl
—CH$_2$—S—CH$_2$—CHOH—CH$_2$OH
mercaptomethyl
—CH$_2$SH
β-mercaptoethyl mercaptomethyl
—CH$_2$—S—CH$_2$—CH$_2$—SH
β-carboxyethyl
—CH$_2$—CH$_2$—COOH
aminomethyl
—CH$_2$—NH$_2$
δ-aminobutyl
—(CH$_2$)$_4$—NH$_2$
n-butylaminomethyl
—CH$_2$—NH—C$_4$H$_9$ and
cyclohexylaminomethyl
—CH$_2$—NH—C$_6$H$_{11}$.

The organopolysiloxanes may be obtained by known methods. For example, the particularly suitable hydroxymethyl polysiloxanes may be obtained by directly reacting bromomethyl polysiloxanes with alcoholic potassium hydroxide. 4-amino-butyl polysiloxanes may be obtained by hydrogenating the readily obtainable nitriles. The corresponding carboxyl derivatives may be obtained by hydrolyzing the cyanoalkyl silicon compounds. Aminomethyl siloxanes may be obtained by aminating the halogen methyl silicon compounds with ammonia or primary amines.

In many cases, the functional groups are first introduced into low molecular weight siloxanes. The thusobtained products are then converted into polysiloxanes of higher molecular weight by the known equilibration reaction.

It is preferred to use polysiloxanes containing at least two and preferably from 6 to 30 siloxane groups and having molecular weights of from 194 to 20,000, preferably from 800 to 3000. Other preferred polysiloxanes are substantially linear organofunctional polysiloxanes and those containing terminal hydroxy groups or amino groups.

Suitable polyfunctional organopolysiloxanes are described, for example, in French Pat. No. 1,291,937 and in German Auslegeschrift No. 1,114,632.

The following are specific examples of organo-functional polysiloxanes which are suitable for use in the process according to the present invention:

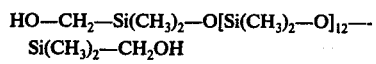

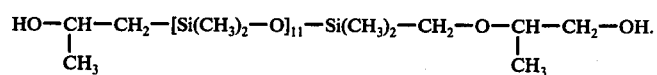

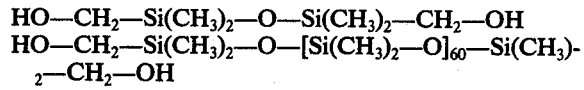

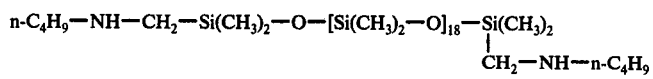

or

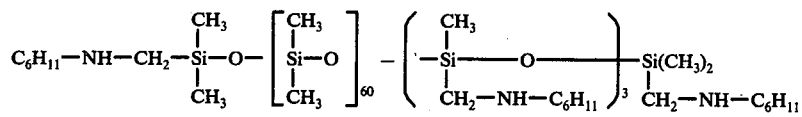

The organopolysiloxanes which are particularly preferred for use in accordance with the present invention correspond to the general formula:

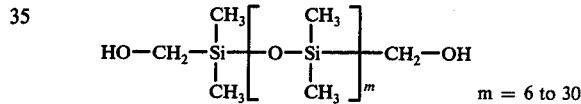

m = 6 to 30

They may be obtained in known manner by reacting 1,1,3,3-tetramethyl-1,3-hydroxymethyl disiloxane corresponding to the formula:

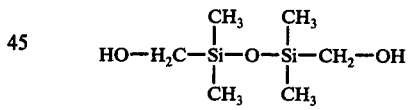

with octamethyl cyclotetrasiloxane in the presence of sulphuric acid or by the process according to German Auslegeschrift No. 1,236,505.

According to the present invention, the carbofunctional organopolysiloxanes are reacted with polyisocyanates in an equivalent ratio between NCO-groups and isocyanatereactive hydrogen atoms of at least 2, and preferably of from 2 to 4 and, most preferably, of from 2.2 to 3.

Isocyanates suitable for use in accordance with the present invention include any aliphatic, cycloaliphatic, araliphatic and aromatic polyisocyanates of the type generally known and described, for example, by W. Siefken in Justus Liebigs Annalen der Chemie 562, pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of the isomers; 1-isocyanato-3,3,5-trimethyl-5-isocyanatomethyl cyclohexane (German Auslegeschrift No. 1,202,785); 2,4- and 2,6-hexahydrotolylene diisocyanate and mixtures of the isomers; hexahydro-1,3- and/or -1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate and mixtures of the isomers; diphenyl methane-2,4'- and/or -4,4'-diisocyanate; naphthylene-1,5-diisocyanate; triphenyl methane-4,4'4''-triisocyanate; polyphenyl-polymethylene-polyisocyanates of the type obtained by condensing aniline with formaldehyde, followed by phosgenation, and described for example in British Pats. Nos. 874,430 and 848,671; and the like.

As a rule, it is preferred to use readily available polyisocyanates such as 2,4- and 2,6-tolylene diisocyanate and mixtures of the isomers ("TDI"); polyphenyl-polymethylene-polyisocyanates of the type obtained by condensing aniline with formaldehyde, followed by phosgenation (MDI); 1,6-hexamethylene diisocyanate (HDI); and 1-isocyanato-3,3,5-trimethyl-5-isocyanatomethyl cyclohexane (IPDI).

In general, the foam stabilizers according to the present invention are produced by initially introducing the polyisocyanates and subsequently adding the organopolysiloxanes. However, it is, of course, possible initially to introduce the organopolysiloxanes and then to add the polyisocyanates to the reaction mixture.

According to the present invention, organo metallic compounds, more especially organo tin compounds, may be used as catalysts for accelerating the reaction.

Preferred organo tin compounds are tin(II) salts or carboxylic acids, such as tin(II)acetate, tin(II)octoate, tin(II)ethyl hexoate and tin(II)laurate, and dialkyl tin salts of carboxylic acids, such as dibutyl tin diacetate, dibutyl tin dilaurate, dibutyl tin maleate or dioctyl tin diacetate.

Further representatives of catalysts suitable for use in accordance with the present invention and information on the way in which the catalysts function may be found in Vieweg and Hochtlen's Kunststoff Handbuch, Vol. VII, Carl-Hanser-Verlag, Munich 1966, pages 96 to 102.

The catalysts are generally used in a quantity of from about 0.001 to 10%, by weight, based on the total weight of the reaction mixture.

According to the present invention, it is also possible to use reaction retarders, for example, acidreacting compounds, such as hydrochloric acid or organic acid halides. According to the present invention, it is necessary, especially in cases where the organopolysiloxanes used still contain alkalis or weakly alkaline reacting substances from their production, to add acid-reacting substances, such as hydrochloric acid, sulphuric acid, p-toluene sulphonic acid, p-toluene sulphonic acid methyl ester or benzoyl chloride, in quantities of from 0.1 to 2%. by weight, preferably from 0.05 to 0.1%, by weight, based on the quantity of the siloxane compound, to the reaction mixtures before the reaction with the polyisocyanates.

After the first stage of the reaction in the process according to the present invention, the NCO-containing addition products are heated whereby branched products are obtained. In this heat treatment, the mixtures are generally heated over a period of from 4 to 20 hours, preferably from 6 to 10 hours, at a temperature of from about 110° to 160° C and preferably at a temperature of from 140° to 150° C. Water jet vacuum is then preferably applied at approximately 150° C until a vacuum of about 14 Torr is reached. Volatile constituents, consisting predominantly of octamethyl cyclotetrasiloxane and excess polyisocyanate, distill off in this vacuum.

The heat treatment of the reaction products of organopolysiloxanes and polyisocyanates which is carried out in the process according to the present invention results in the development of branchings through allophanate, biuret and/or isocyanurate groups. Thereafter, the products have an average functionality (number of free NCO-groups) of preferably from about 3 to 4.

In a third stage, the relatively high molecular weight, branched NCO-containing addition products obtained in the second stage are reacted with monofunctional polyethers corresponding to the following general formula:

$$R'' - (OC_nH_{2n})_x - OH$$

wherein $n$ represents an integer of from 2 to 4, $x$ represents an integer of from 1 to 100, preferably from 15 to 50, and $R''$ represents a monofunctional $C_1$—$C_{20}$, preferably $C_4$—$C_{12}$, hydrocarbon radical optionally containing oxygen or nitrogen as hetero atoms; in an NCO:OH ratio of from 0.8 to 1.2, preferably in an NCO:OH ratio of about 1, at a temperature of from about 30° to 150° C and, preferably, at a temperature of from 100° to 130° C. According to the present invention, catalysts, especially organometallic compounds and, with particular preference organotin compounds, may also be added during this stage of the reaction. According to the present invention, it is of advantage particularly in cases where no catalysts were used in the first stage of the reaction, i.e. during reaction of the polysiloxanes with the diisocyanates, to catalyze this third stage of the reaction with organotin compounds.

According to the present invention, it is particularly preferred to use monofunctional polyethers which have been produced by the polymerization of a mixture of ethylene oxide and propylene oxide (molar ratio 1:9 to 9:1) on alkanols, preferably butanol, as starter.

Preferred organotin compounds are again tin(II) salts of carboxylic acids, such as tin(II)acetate, tin(II) octoate, tin(II)ethyl hexoate and tin(II)laurate, and also the dialkyl tin salts of carboxylic acids, such as dibutyl tin diacetate, dibutyl tin dilaurate, dibutyl tin maleate or dioctyl tin diacetate.

The catalysts are again generally added in a quantity of from about 0.0001 to 10%, by weight, based on the mixture as a whole.

After the catalyst has been added, a gentle exothermic reaction is observed, the previously hazy mixture of the reaction components becomes transparent. In order to complete the reaction, the reaction mixture is maintained at approximately 100° C for about another hour.

After cooling, foam stabilizers having viscosities at 25° C of, in general, from 2000 to 80,000 cP are obtained, depending upon the type of starting components used.

The relatively high viscosity of the stabilizers produced in accordance with the present invention is often a disadvantage for machine processing into foam formulations. Accordingly, the end products of the process according to the present invention are preferably used in solution in solvents which do not affect the activity of the stabilizer. Generally, it is preferred to use water-soluble diluents. Polyethers having terminal primary OH-groups corresponding to the following general formula are particularly suitable:

$$R'''[-(OC_nH_{2n})_x-OH]_k$$

wherein
n represents an integer of from 2 to 4,
x represents an integer of from 1 to 100, preferably from 15 to 50,
R''' represents a k-functional hydrocarbon having from 2 to 20 carbon atoms, and
k represents an integer of from 2 to 8.

By mixing the stabilizers with polyethers of this type in a quantitative ratio of from 2:1 to 1:4, and preferably from 1:1 to 1:2, stabilizer solutions are obtained having viscosities of from approximately 1000 to 3000 cP/25° C.

It is extremely surprising that these mixtures of the foam stabilizers according to the present invention with polyethers are almost as active in their stabilizing and cell-regulating properties as an equivalent quantity of the pure end product of the process according to the present invention (cf. Examples 2 and 3).

The polyether diluents suitable according to the instant invention, generally contain from 2 to 8 and preferably 2 to 3 hydroxyl groups are generally known and may be obtained, for example, by the polymerization of epoxides, such as ethylene oxide, propylene oxide, butylene oxide, tetrahydrofuran, styrene oxide or epichlorohydrin, on their own, for example, in the presence of $BF_3$, or by the addition of these epoxides, optionally in admixture or successively, with starter components containing reactive hydrogen atoms, such as water, alcohols or amines, such as ethylene glycol, 1,3- or 1,2-propylene glycol, 1,4-butane diol, trimethylol propane, 4,4'-dihydroxy diphenyl propane, aniline, ammonia, ethanolamine or ethylene diamine. It is also possible in accordance with the present invention to use sucrose polyethers of the type described, for example, in German Auslegeschriften Nos. 1,176,358 and 1,064,938. In many cases, it is preferred to use polyethers of the type which contain predominant amounts of primary OH-groups (up to 90%, by weight, based on all the OH-groups present in the polyether). Polyethers modified by vinyl polymers, of the type obtained, for example, by polymerizing styrene and acrylonitrile in the presence of polyethers (U.S. Pats. Nos. 3,383,351; 3,304,273; 3,523,093; 3,110,695; German Pat. No. 1,152,536) are also suitable, as are polybutadienes containing OH-groups.

It is, of course, preferred to use liquid polyhydroxyl compounds of extremely low viscosity as solvents for the products obtained by the process according to the present invention.

The production of foams using the stabilizers according to the present invention is carried out in known manner by reacting polyisocyanates (for example of the type described above) with compounds containing two or more isocyanate-reactive hydrogen atoms (generally polyethers or polyesters having from 2 to 8 hydroxyl groups and a molecular weight of from 500 to 10,000) in the presence of blowing agents and, optionally, catalysts (cf. for example, Vieweg and Hochtlen's Kunststoff-Handbuch, Vol. VII, Carl-Hanser-Verlag, Munich, 1966; Saunders-Frisch: Polyurethanes, Chemistry and Technology, Interscience Publishers, New York-London, 1962).

The foam stabilizers are generally added to the foamable mixture in a quantity of from 0.4 to 2.0%, by weight, and preferably in a quantity of from 0.5 to 1.5%, by weight based on the total weight of the foamable reaction mixture.

The $\omega,\omega'$-bis-(hydroxymethyl)-polydimethyl siloxanes used in the Examples were produced in accordance with German Auslegeschrift No. 1,236,505. The following are specific, nonlimiting examples which are provided to illustrate the enumerated principles described herein. All parts are by weight unless otherwise indicated.

EXAMPLE 1(A)

Production of stabilizer 50 g of p-toluene sulphonic acid methyl ester are added at room temperature to 77.88 kg of $\omega,\omega'$-bis-(hydroxymethyl)-polydimethyl siloxane (OH number 78). The mixture is then heated under nitrogen to 70° C. 22.12 kg of a mixture of 2,4- and 2,6-tolylene diisocyanate (80:20) are then added to the mixture at that temperature. Under the effect of the exothermic reaction which begins immediately, the contents of the vessel undergo an increase in temperature to from 100° to 110° C. The mixture is then heated to 150° C. and maintained at that temperature for 6 hours. Water jet vacuum is then applied until, finally, a vacuum of 14 Torr is reached. 756 g of volatile constituents, consisting predominantly of octamethyl cyclotetrasiloxane, distill off. After the heat treatment and vacuum treatment the prepolymer has as NCO-content of 4.55%.

The contents of the vessel are left to cool to 130° C. 282 kg of a polyether is added. The polyether is based on propylene oxide and ethylene oxide in a mixing ratio of 50:50 (OH number 21.5), and is started on n-butanol in the presence of catalytic quantities of sodium alcoholate. After homogenization of the components 0.05% of tin(II)ethyl hexoate is added based on the mixture as a whole. After the catalyst has been added, a gentle exothermic reaction is observed and the previously hazy mixture of the components becomes clear. To complete the reaction, the mixture is maintained at 100° C for a period of one hour. The stabilizer then formed has a viscosity of 41,800 cP/25° C and a refractive index $n_D^{20}$ of 1.4615.

EXAMPLE 1(B)

Production of a machine-processible stabilizer solution

The high viscosity of the stabilizer produced in accordance with Example 1(A) is reduced simply by mixing the stabilizer with a 1,3-propylene glycol-started polyether, in which propylene oxide and ethylene oxide in a mixing ratio of 50:50 have been polyadded in the presence of catalytic quantities of sodium alcoholate (OH number 56). Mixing is carried out in a mixing ratio by weight of stabilizer to "solvent polyether" to 1:2. The solution has a viscosity of 1780 cP/25° C and is eminently suitable for machine processing.

EXAMPLE 2(A)

Production of a polyurethane-polyurea foam using the stabilizer according to Example 1(A)

100 parts, by weight, of the polyether described below are thoroughly mixed with 0.2 part, by weight, of triethylene diamine and 0.25 part, by weight, of the tin(II) salt of 2-ethyl caproic acid. 1.2 parts, by weight, of the stabilizer and 4 parts, by weight of water are then added. 50 parts, by weight, of tolylene diisocyanate (80% of 2,4- and 20% of 2,6-isomer) are then added to this mixture, followed by thorough mixing with a high-speed stirrer. After a cream time of 10 seconds, foam formation begins and a white, flexible, elastic open- and fine-pored polyurethane-polyurea foam is formed.

The polyether used for producing the polyurethane-polyurea foam was produced as follows:

Propylene oxide was first subjected to polyaddition onto a mixture of trimethylol propane and propylene glycol in the presence of catalytic quantities of sodium alcoholate. Ethylene oxide was polyadded in a second stage. The liquid polyether contains primary and secondary hydroxyl groups and has an OH number of 49, an average molecular weight of 3200 and an average functionality of 2.78.

EXAMPLE 2(B)

Production of a polyurethane-polyurea foam using the stabilizer solution according to Example 1(B)

100 parts, by weight, of the polyether (OH number 49) used in Example 2(A) are thoroughly mixed with 0.2 part, by weight, of triethylene diamine, 0.25 part, by weight, of the tin(II)salt of 2-ethyl caproic acid, 1.2 parts, by weight, of the stabilizer solution and 4 parts, by weight, of water. 50 parts, by weight, of tolylene diisocyanate (80% of 2,4- and 20% of 2,6-isomer) are stirred into this mixture using a high-speed stirrer. After a cream time of 10 seconds, foam formation begins and a white, flexible, elastic, open- and fine-pored polyurethane-polyurea foam is formed in the same way as in Example 2(A).

EXAMPLE 3

Production of a self-extinguishing polyurethane-polyurea foam using the stabilizer solution described in Example 1(B)

100 parts by weight of the polyether described in Example 2(A), 3.0 parts by weight of water, 0.10 part by weight of ethyl diethanolamine, 0.22 part by weight of tin octoate and 5 parts by weight of tris-(2,3-dibromopropyl)-phosphate as flameproofing agent are thoroughly mixed. 0.6 part by weight of stabilizer (three different foams were produced with three different stabilizers) are added to the resulting mixture, followed by the introduction of 40.7 parts by weight of tolylene diisocyanate (80% of 2,4- and 20% of 2,6-isomer). The mixture was then thoroughly stirred using a high-speed stirrer. Foams having the characteristics described below are obtained, depending upon the particular stabilizer used.

|  | Commercial polyether-polysiloxane stabilizer ("B 2730" of Goldschmidt AG Essen, Germany) | Stabilizer of Example 1(b) | Commercial polyether-polysiloxane flame proofing stabilizer ("B 3640", Goldschmidt AG Essen, Germany) |
|---|---|---|---|
| Rise time [sec.] | 140 | 131 | 138 |
| Gel time [sec.] | 53 | 46 | 39 |
| Density (DIN 53420) [kg/m$^3$] | 37 | 32 | 34 |
| Tensile strength (DIN 53571) [KPa] | 90 | 110 | 100 |
| Elongation at break (DIN 53571) [%] | 140 | 270 | 230 |
| Compression hardness at 40% (DIN 53577) [KPa] | 5.00 | 3.34/3.43 | 3.63 |
| Compression set at 90% | 4.1 | 3.7 | 3.6 |
| Flameproof testing in accordance with ASTM D 1692 - 68 | | | |
| Average charred length | 64 | 48 | 47 |
| Average extinguishing time | 51 | 34 | 39 |
| Average burning rate | — | — | — |
| Assessment | SE | SE | SE |
| After 22 hours ageing in hot air (140° C): | | | |
| Average charred length | (115) | 46 | — |
| Average extinguishing time | 106 | 27 | — |
|  | Standard Commercial-grade stabilizer ("OS 20"; Bayer) | Stabilizer of Example 1 (b) | Standard Commercial-grade flame proofing stabilizer ("B3640"; Goldschmidt AG Essen) |
| Average burning rate | 76 | — | 94 |
| Assessment | Br | SE | Br |
| After 5 days ageing at 90° C/95% relative humidity | | | |
| Average charred length | — | 47 | — |
| Average extinguishing time | — | 27 | — |
| Average burning rate | 59 | — | 87 |
| Assessment | Br | SE | Br |
| After 5 hours ageing at 120° C in a steam autoclave: | | | |
| Average charred length | 72 | 38 | 40 |
| Average extinguishing time | 68 | 28 | 33 |

|  |  |  |  |
|---|---|---|---|
| Average burning rate | — | — | — |
| Assessment | SE | SE | SE |

SE = self-extinguishing
Br = burning

EXAMPLE 4

50 g of p-toluene sulphonic acid methyl ester are added under nitrogen at room temperature to 69.4 kg of the organopolysiloxane of Example 1, followed by the addition at 70° C of 30.6 kg of 4,4'-diisocyanatodiphenyl methane. Under the effect of the exothermic reaction which begins immediately, the contents of the vessel undergo an increase in temperature to from approximately 100° to 110° C. The mixture is then heated to 150° C and maintained at that temperature for 7.5 hours. A water jet vacuum is then applied until finally a vacuum of 14 Torr is reached. Approximately 620 g volatile constituents, consisting predominantly of octamethyl cyclotetrasiloxane, distill off. The prepolymer formed has an NCO-content of 5.04%. The contents of the vessel are left to cool to from 120° to 130° C, followed by the addition of 311 kg of the n-butanol-started polyether of Example 1 and then, after homogenization of the components, by the addition of 0.05% of tin-(II)ethyl hexoate, based on the mixture as a whole. After the activator has been added, a gentle exothermic reaction is observed. and the previously hazy mixture of the components becomes clear. In order to complete the reaction, the mixture is maintained at 100° C for 1 hour. Thereafter, the stabilizer has a viscosity of 41,900 cP/25° C. After the stabilizer has been mixed with the polyether described in Example 1(B) in a mixing ratio of 1:2, a stabilizer solution having a viscosity of 1750 cP/75° C is obtained.

EXAMPLES 5 – 14

General Procedure 0.05% of p-toluene sulphonic acid methyl ester (based on the total quantity) are added at room temperature to 100 g of ω,ω'-bis-(hydroxymethyl)-polydimethyl siloxane, followed by the introduction at 70° C of the specified quantity of polyisocyanate (NCO:OH-ratio >2). The mixture is then heated to the temperature indicated and left at that temperature for 5 to 6 hours. A water jet vacuum is then applied until finally a vacuum of 14 Torr is reached. After vacuum treatment for 1 hour, the NCO-number of the prepolymer is determined. The mixture is left to cool to 130° C, followed by addition of the specified quantity of the monofunctional polyether (NCO:OH-ratio = 1) and then, after homogenization of the components, by the addition of 0.05% of tin(II) ethyl hexoate, based on the mixture as a whole. In order to complete the reaction, the mixture is maintained at 100° C for 1 hour. The final stabilizers have the viscosities indicated.

The monofunctional polyether used was obtained by the polyaddition of alkylene oxide/propylene oxide in a mixing ratio of 1:1 onto n-butanol.

| | Mixture | | | Reaction conditions | | NCO-reaction product | | Polyether | g of polyester 100 g of reaction product | Stabilizer viscosity [cp/25° C] |
|---|---|---|---|---|---|---|---|---|---|---|
| Example No. | Diisocyanate | Diisocyanate [g] | Polysiloxane (OH-number) | °C | Hours | % NCO | viscosity [cp/25° C] | OH-number | | |
| 5 | HDI | 28.0 | 78 | 150 | 5 | 4.88 | 398 | 32.8 | 199 | 10,400 |
| 6 | HDI | 25.7 | 78 | 150 | 5 | 4.68 | 245 | 32.8 | 191 | 4,740 |
| 7 | HDI | 23.3 | 78 | 150 | 5 | 3.87 | 360 | 32.8 | 158 | 5,700 |
| 8 | HDI | 23.3 | 78 | 150 | 5 | 3.87 | 360 | 21.4 | 241 | 16,500 |
| 9 | IPDI | 36.5 | 78 | 150 | 5 | 4.72 | 750 | 32.8 | 192.5 | 2,300 |
| 10 | IPDI | 36.5 | 78 | 150 | 5 | 4.72 | 750 | 21.4 | 294 | 3,400 |
| 11 | MDI | 44.1 | 78 | 150 | 6 | 5.03 | 3810 | 21.4 | 313 | 29,200 |
| 12 | TDI | 28.6 | 78 | 150 | 5 | 4.54 | 3750 | 38.7 | 156.5 | 39,870 |
| 13 | TDI | 13.9 | 38 | 150 | 6 | 2.69 | 477 | 21.4 | 168 | 34,200 |
| 14 | TDI | 72.2 | 198 | 150 | 6 | 10.08 | 5746 | 21.4 | 628 | 5,290 |

EXAMPLE 15

1.6 g of p-toluene sulphonic acid methyl ester are added at room temperature to 2460 g of ω,ω'-bis-(hydroxymethyl)-polydimethyl siloxane (OH-number 78), followed by the introduction under nitrogen at 70° C of 700 g of tolylene diisocyanate (80% of 2.4- and 20% of 2,6-isomer). Under the effect of the exothermmic reaction which begins immediately, the mixture undergoes an increase in temperature to form 100° to 110° C. The mixture is then heated to 150° C and maintained at that temperature for 6 hours. A vacuum is then applied until finally a vacuum of 14 Torr is reached. 50 g of octamethyl cyclotetrasiloxane and excess tolylene diisocyanate distill off. Thereafter, the prepolymer has an NCO-content of 4.4% and a viscosity of 3140 cP/25° C. 3100 g of the siloxane prepolymer obtained in this way are then mixed with 9000 g of a butanol-started polyether (OH-number 18.8) in which ethylene oxide/propylene oxide in a mixing ratio of 70.30 were initially polyadded in the presence of catalytic quantities of sodium alcoholate, followed in a second stage by the polyaddition of ethylene oxide, the resulting mixture heated from 90° to 100° C and 10 ml of tin (II)octoate added. To complete the reaction, the mixture is stirred under nitrogen for 1 hour at from 90° to 100° C. The NCO-free stabilizer has a viscosity of 75,000 cP/25° C.

The high viscosity of the stabilizer is reduced by mixing with the polyether described in Example 1(b) and by the process described in Example 1(b) in a mixing ratio of 1:2 between stabilizer and "solvent polyether". The solution then has a viscosity of 1800 cP/25° C.

EXAMPLE 16

Production of a polyester-polyurethane foam 100 parts, by weight, of a polyester having an OH-number of 60 and an acid number of at most 1.5, produced from adipic acid, diethylene glycol and trimethylol propane, 3 parts, by weight, of water, 1.0 parts, by weight, of ethyl diethanolamine, 40 parts, by weight, of tolylene diisocyanate (80% of 2,4- and 20% of 2,6-isomer) and 1.5 parts, by weight, of the foam stabilizer of Example 15 are thoroughly mixed using a high-speed stirrer. Foams having the following characteristics are obtained:

density (kg/m$^3$): 38
tensile strength (KPa): 160
elongation at break (%): 140
compression hardness at 40% (KPa): 7.0
compression set at 50%: 3.8

EXAMPLE 17

Production of a hydrophilic polyether polyurethane foam 100 parts, by weight, of a glycerol-started polyether, in which propylene oxide was first polyadded in the presence of catalytic quantities of sodium alcoholate, followed in a second stage by the polyaddition of ethylene exide (OH-number 26; average functionality 3; average molecular weight 6500), 3 parts by weight, of water, 0.25 part, by weight, of dimethyl benzylamine, 0.4 part by weight of tin(II)octoate, 35.6 parts, by weight, of tolylene diisocyanate (65% of 2,4- and 35% of 2,6-isomer) and 0.8 part, by weight, of the foam stabilizer of Example 15 are thoroughly mixed using a high-speed stirrer. A foam having the following characteristics is obtained:

density (kg/m$^3$): 32
tensile strength (KPa): 98
elongation at break (%): 390
compression hardness at 40% (KPa): 5.0
compression set at 90%: 8.20
tensile strength, wet (KPa): 58.9
elongation at break, wet (%): 175

What is claimed is:

1. A process for the production of polysiloxane-polyoxy-alkylene copolymers, comprising (a) reacting organopolysiloxanes corresponding to the general formula:

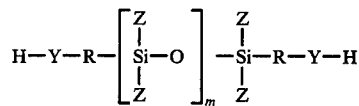

wherein m represents an integer of from 1 to 100,

Z, which may be the same or different, represent $C_1$-$C_5$ alkyl radical, $C_6$-$C_{15}$ aryl radicals, siloxyl or siloxanyl radicals, or the group —R—Y—H, R represents a $C_1$-$C_6$ alkylene radical which may contain one or more hetero atoms, Y represents —NR'—, —O—,

or —S— and

R' represents a hydrogen atom or a $C_1$-$C_6$ alkyl or $C_5$-$C_9$ cycloalkyl radical;

with polyisocyanates in an NCO:YH equivalent ratio of at least 2, heating the NCO-containing addition products thus obtained at from 110° to 160° C to cause branching, and (c) reacting the resulting branched NCO-containing addition products of relatively high molecular weight with a monofunctional polyether corresponding to the general formula:

wherein n represents an integer of from 2 to 4, x represents an integer of from 1 to 100 and R" represents a monofunctional $C_1$-$C_{20}$ hydrocarbon radical optionally containing oxygen or nitrogen as hetero atoms, in an NCO:OH-ratio of from 0.8 to 1.2.

2. The process of claim 1 further comprising mixing the copolymer with from 0.5 to 4 parts of polyether corresponding to the following general formula:

wherein n represents an integer of from 2 to 4 x represents an integer of from 1 to 100, k represents an integer of from 2 to 8 and R'" represents a k-functional hydrocarbon radical having from 2 to 20 carbon atoms.

3. The process of claim 1 wherein the organopolysiloxanes are added to the polyisocyanates.

4. The process of claim 1 wherein the equivalent ratio NCO:YH is from 2 to 4.

5. The process of claim 1 wherein the equivalent ratio NCO:YH is from 2.2 to 3.

6. The process of claim 1 wherein the heating is from 4 to 20 hours.

7. The product of the process of claim 1.